United States Patent [19]

Twardowski

[11] Patent Number: 4,678,655
[45] Date of Patent: Jul. 7, 1987

[54] ACID RECOVERY IN CLORINE DIOXIDE GENERATION

[75] Inventor: Zbigniew Twardowski, Mississauga, Canada

[73] Assignee: ERCO Industries Limited, Islington, Canada

[21] Appl. No.: 636,506

[22] Filed: Aug. 1, 1984

[51] Int. Cl.[4] ..................... C01B 11/02; B01D 13/00; C02F 1/70
[52] U.S. Cl. .................................. 423/478; 210/638; 210/639; 210/757; 210/913; 423/480
[58] Field of Search ................ 423/478, 480; 210/638, 210/639, 757, 913

[56] References Cited

U.S. PATENT DOCUMENTS

| 2,376,935 | 5/1945 | Persson | 423/478 |
|---|---|---|---|
| 2,765,215 | 10/1956 | Pechukas et al. | 423/478 |
| 3,132,095 | 5/1964 | Wolf et al. | 210/638 |
| 4,104,365 | 8/1978 | Howard et al. | 423/478 |
| 4,108,770 | 8/1978 | Roy | 210/757 |

OTHER PUBLICATIONS

Process Study of A.R.P. Process, Cowley, 11-9-1977.
Visit Report at Abitibi-Price Inc. Cowley et al., 11-2-7-1981.
"Chemical Engineering", vol. 91, No. 12, pp. 77, 80, 89, McGraw-Hill Publishing Co., June 11, 1984.

Primary Examiner—John Doll
Assistant Examiner—Jeffrey Edwin Russel
Attorney, Agent, or Firm—Sim & McBurney

[57] ABSTRACT

Effluent acid from a non-evaporating chlorine dioxide-generating process is subjected to diffusion-dialysis across an anion-exchange membrane to preferentially transfer sulphuric acid from the effluent acid stream to a recipient aqueous medium while sodium sulphate remains in a waste stream. The sulphuric acid extracted from the effluent acid stream on this way may be recycled to the chlorine dioxide generator, after concentration, if desired.

24 Claims, 2 Drawing Figures

ACID RECOVERY IN CLORINE DIOXIDE GENERATION

FIELD OF INVENTION

The present invention relates to the production of chlorine dioxide, and in particular to the recovery of spent acid from non-precipitating chlorine dioxide generators.

BACKGROUND TO THE INVENTION

Chlorine dioxide, useful for bleaching wood pulps, is known to be produced by a number of processes, many of which are practised on an industrial scale, on site at pulp mills. The basis of most of these processes is reduction of sodium chlorate in an acid aqueous reaction medium.

Most commonly in industrial applications, the acid is provided by sulphuric acid and the reducing agent is chloride ions. The reaction whereby chlorine dioxide is fromed is depicted by the following equation:

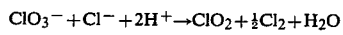

$$ClO_3^- + Cl^- + 2H^+ \rightarrow ClO_2 + \tfrac{1}{2}Cl_2 + H_2O$$

The chloride ion reductant may be added to the reaction medium from external sources, as in the commercial processes known as the "R2" and "R3" processes, or may be produced in situ by reduction of the chlorine, as in the commercial processes known as the "Mathieson" and "Solvay" processes, wherein sulphur dioxide and methanol respectively are used to provide the chlorine reduction. These processes are based on the continuous flow of reactants to the generator and result in the production of sodium sulphate as a by-product.

In the R3-process, water is evaporated from the reaction medium while a subatmospheric pressure is applied to the reaction medium, enabling low acid normalities to be used and the precipitation of anhydrous neutral sodium sulphate from the reaction medium to be effected. In the other commercial processes mentioned above, however, namely the R2-process, Mathieson-process and Solvay-process, high total acid normalities are used and spent highly acidic reaction medium containing unreacted sulphuric acid and by-product sodium sulphate is allowed to overflow or otherwise exit the reactor.

One common procedure for processing the latter aqueous acid effluent stream which has been adopted is to feed the aqueous effluent to the recovery system of the pulp mill as a sulphur make-up chemical. However, this procedure can lead to excess sulphidity, which upsets the chemical balance of the pulp mill and hence is undesirable. Some other acid effluent utilizations, including cascading to a crystallizing R3-type chlorine dioxide generator (as suggested in U.S. Pat. No. 3,446,584) and utilization in tall oil separation, are possible, but are not applicable in many mill conditions and additional capital equipment is required.

There exists a need, therefore, for a process for treating the sulphuric acid- and sodium sulphate-containing effluent stream from a non-evaporating chlorine dioxide generator to effect recovery of sulphuric acid therefrom for utilization in any desirable manner, for example, by recycling to the chlorine dioxide generator.

One prior suggestion for the treatment of such effluent stream is contained in Lobley et al U.S. Pat. No. 4,104,365, wherein it is suggested to treat the sulphuric acid- and sodium sulphate-containing effluent stream with water and methanol to precipitate sodium sulphate therefrom. Following separation of the precipitated sodium sulphate, the methanol is stripped from the liquid phase for reuse and the sulphuric acid is concentrated to the desired concentration.

This prior art procedure suffers from a number of drawbacks which have severely limited its commercial implementation. The procedure requires physical separation of the precipitated sodium sulphate, which often is difficult to perform effectively, especially when sodium dichromate is present, which is the case when cell liquor is used as the sodium chlorate feed to the chlorine dioxide generator. In addition, the procedure requires a stripper to enable the methanol to be removed from the liquid phase and special handling equipment for the collecting and condensing the highly volatile and inflammable methanol vapors.

SUMMARY OF INVENTION

In accordance with the present invention, there is provided a process of treating a sulphuric acid- and sodium sulphate-containing aqueous effluent stream from a chlorine dioxide generating process wherein chlorine dioxide is generated by reduction of sodium chlorate, or other water-soluble chlorate, in an aqueous sulphuric acid-containing reaction medium to which chlorine dioxide-generating reactants are continuously fed and from which sodium sulphate is not precipitated, which comprises effecting preferential sulphuric acid migration from the effluent stream across an anion-exchange membrane to a recipient aqueous medium which has a lesser acid concentration than the effluent stream and simultaneous preferential sodium sulphate retention in the effluent stream.

The recipient aqueous medium usually is water. The migration of the sulphuric acid from the chlorine dioxide generator effluent stream across the anion-exchange membrane, in preference to the sodium sulphate, results in depletion of acid from the effluent stream and formation of a sulphuric acid solution having a significantly-lower concentration of sodium sulphate than the effluent stream. In this way, a relatively pure sulphuric acid stream can be obtained from the acid effluent stream. The acid content of the recovered acid stream may be reutilized in chlorine dioxide production from the generator or used for any other convenient purpose. The recovered acid stream may require concentration to a higher acid normality, such as by evaporation, prior to such reuse.

The process of the invention does not suffer from the drawbacks of the Lobley et al process. The process of the invention does not require the physical separation of precipitated sodium sulphate such as is required in the Lobley et al process, in that both the sulphuric acid and sodium sulphate are recovered as aqueous solutions, so that difficulties inherent in such separation are avoided. The process of the invention does not require the utilization of methanol or other volatile inflammable organic liquid nor the utilization of a methanol stripper and special handling equipment, such as is required in Lobley et al. Although the present invention requires a diffusiondialyser having the anion-exchange membranes, the capital costs are less and the hazards and operational problems of the methanol stripping and recovery in Lobley et al are not present.

GENERAL DESCRIPTION OF INVENTION

Essential to the present invention is the utilization of anion-exchange membranes. Such membranes are commercially-available and have been used in a wide variety of applications, but never to the peculiar problem of highly acidic chlorine dioxide generator effluents. For example, such anion-exchange membranes have been used in acid diffusiondialysis involving waste acids from pickling steels, refining of waste acid from lead-acid batteries, separation and recovery in metal refining processes, treatment of waste acid in alumite, waste acid from etching of metals, for example, aluminum and titanium, waste acid from surface treatment in plating systems, and treatment of waste acid from deoxidation and refining operations in organic compound synthesis.

Anion-exchange membranes generally comprise a polymeric matrix having anionic groups thereon. The polymeric matrix may be provided by polystyrene, polyethylene, polysulphone, polytetrafluoroethylene or fluorinated ethylene polymer. Ionic groups include amine, quaternized amine, phosphonium and sulphonium. Suppliers of anion-exchange membranes include Tokuyama Soda Co. Ltd., Japan and Asahi Glass Co. Ltd., Japan.

Anion-exchange membranes, by definition, are permeable to anionic species, in this instance sulphate and bisulphate ions. However, owing to its inherently high mobility, the hydronium ion also leaks through the membrane while other cations are prevented from similar passage. By modification of the membrane parameters, for example, membrane thickness, the ion-exchange capacity and degree of cross-linking, the transport properties of the membrane can be varied and can be optimized for a particular acid and salt combination.

The effluent acid stream from a non-evaporating chlorine dioxide generator contains sulphuric acid and by-product sodium sulphate. By subjecting this stream to diffusiondialysis using an anion-exchange membrane, sulphate ions, bisulphate ions and hydronium ions preferentially are transported across the membrane while the sodium ions are preferentially prevented from such migration. Depending on the characteristics of the anion-exchange membrane, the degree to which sodium ion transportation is prevented may vary, but for the effective operation of the invention is always less than the transportation of sulphate ion, bisulphate ion and hydronium ion.

Reference is made herein from time to time to transportation of sulphuric acid and sodium sulphate across an anion-exchange membrane. It will be appreciated that these references are for convenience and do not represent an accurate description of the mechanisms involved. It is the ionic species, namely sulphate ion, bisulphate ion, hydronium ion and sodium ion, which pass through or are prevented from passing through the membrane.

For economics of operation, it is preferred to recover as much of the sulphuric acid as possible from the effluent acid stream while obtaining a recovered sulphuric acid stream which can be concentrated to a desired level for reuse without resulting in precipitation of sodium sulphate. In addition, the concentration of sulphuric acid which results from the diffusiondialysis preferably is sufficiently high so that excessive evaporation, and hence energy costs, is not required to produce the desired concentration of sulphuric acid for reuse.

For the conventional Mathieson process of chlorine dioxide production, wherein sulphur dioxide is employed as a reactant along with sodium chlorate and sulphuric acid, the effluent reaction medium overflowing from the generator usually has a sulphuric acid concentration of about 4.3 to about 4.6 molar and a sodium sulphate concentration of about 2.1 to about 2.8 molar. For the R2-process, wherein sodium chloride is used as a reactant along with sodium chlorate and sulphuric acid, the effluent reaction medium usually has a sulphuric acid concentration of about 4.5 to about 5.5 molar and a sodium sulphate concentration of about 2.3 to about 3.0 molar. For the Solvay process, wherein methanol is used as a reactant along with sodium chlorate and sulphuric acid, the effluent reaction medium usually has a sulphuric acid concentration of about 3.5 to about 4.6 molar and a sodium sulphate concentration of about 1.8 to about 2.8 molar.

It is preferred to recover at least about 70% of the sulphuric acid contained in these effluent streams as a sulphuric acid stream having an acid concentration of at least 3.0 molar and having a sodium sulphate concentration insufficiently high as to precipitate from the recovered sulphuric acid upon concentration to a sulphuric acid concentration of at least about 65 wt.% $H_2SO_4$.

The diffusiondialysis process of the present invention may be effected in any convenient manner. In one mode of operation, effluent acid stream from the chlorine dioxide generator is passed along one face of an anion-exchange membrane located in a convenient housing while water is passed along the other face of the membrane in a flow direction countercurrrent to the flow of the effluent acid stream. Sulphuric acid migrates across the anion-exchange membrane from the effluent acid stream to the water in preference to the sodium sulphate, so that the major portion of the sodium sulphate remains in the effluent acid stream while the major portion of the sulphuric acid passes into the recipient medium. As sulphuric acid is transported across the anion-exchange membrane, water also flows through the membrane to the effluent acid side of the membrane to dilute the sodium sulphate and prevent precipitation thereof in the membrane housing.

The anion-exchange member usually is provided as a flat thin film and the housing in which the membrane is located usually has a shallow elongate cavity in which the membrane is positioned to divide the space into substantially equal volumes, so that relatively thin films of liquid are presented at the faces of the membrane. Usually, a plurality of such housings are mounted together in a stack to effect simultaneous diffusiondialysis of a substantial volume of effluent acid stream. Alternatively, the anion-exchange membrane may be provided in tubular form, in which case the housing may take the form of a tube-and-shell structure.

The process of the invention conveniently and usually is effected at ambient room temperature although any other convenient temperature may be adopted, usually up to about 55° C. Higher temperatures generally lead to higher diffusion rates but, in some instances of anion-exchange membranes, the diffusion rate for sodium sulphate increases faster than for sulphuric acid at the higher temperatures and hence is less beneficial.

Relative flow rates of the effluent acid stream and recipient aqueous medium on the opposite sides of the membrane are controlled within desired parameters. As the flow rate of the recipient medium increases relative to the flow rate of the effluent acid stream, the concentration of sulphuric acid resulting from the process declines but generally the selectivity of the diffusiondialysis, i.e. the degree to which sulphuric acid is transported across the membrane in preference to sodium sulphate, improves with increasing flow rate. The absolute concentration of recovered sulphuric acid depends not only on the relative flow rates but also on the concentration of the effluent acid stream which is treated in accordance with this invention.

The sulphuric acid stream which is recovered in the process of the invention may be used for any convenient purpose. One preferred use of the recovered acid stream is as acid feed for the chlorine dioxide-generating process which produced the original effluent acid stream, or for another chlorine dioxide-generating process. The maximum strength of sulphuric acid which may be recycled to the generator is limited by the salt content thereof and the desire to avoid precipitation of sodium sulphate upon concentration of the recovered sulphuric acid stream.

The sulphuric acid stream which is recovered from the process of the invention may be concentrated to any desired level consistent with the desire not to precipitate sodium sulphate. Avoidance of precipitation of sodium sulphate from the recovered sulphuric acid stream is desired since the sodium sulphate which would be precipitated would be in the form of an acid sulphate, which is difficult to separate from the aqueous phase and would remove part of the acid content of the recovered acid stream. Such concentration may be effected by boiling at an elevated temperature, with the application of subatmospheric pressure, if desired.

The sodium sulphate present in the effluent acid stream and which does not migrate across the membrane is present in an acidic sodium sulphate waste stream. Some of the initial acid content of the effluent acid stream remains in the waste stream.

Anion-exchange membranes often are sensitive to active chlorine and are degraded thereby. The effluent acid stream from the chlorine dioxide generator usually contains traces of chlorine and chlorine dioxide, as well as sodium chlorate. The effluent acid streams to be processed using such active chlorine-sensitive anion-exchange membranes need to be treated with any convenient reducing agent to convert these species to harmless chlorides. Reducing agents which have been found satisfactory for this purpose include sodium sulfite and sulphur dioxide.

This reduction step also reduces any dichromate ions to $Cr^{III}$ ions, which then largely remain with the sodium sulphate in the diffusiondialysis operation and are removed in the waste acidic sodium sulphate stream. The presence of dichromate ions in the effluent acid stream from the chlorine dioxide generator does not represent a limitation upon the scope of the process, in contrast to the Lobley et al process. As noted earlier, such dichromate ions may be present when cell liquor is used as the feed of sodium chlorate to the chlorine dioxide generator.

The presence of particulates in either the effluent acid stream or the recipient water stream can cause deposition on the membrane and consequential interference with the flow pattern. It is preferred, therefore, to filter the streams substantially free from particulates prior to contact with the membrane.

DESCRIPTION OF PREFERRED EMBODIMENT

Figure 1:
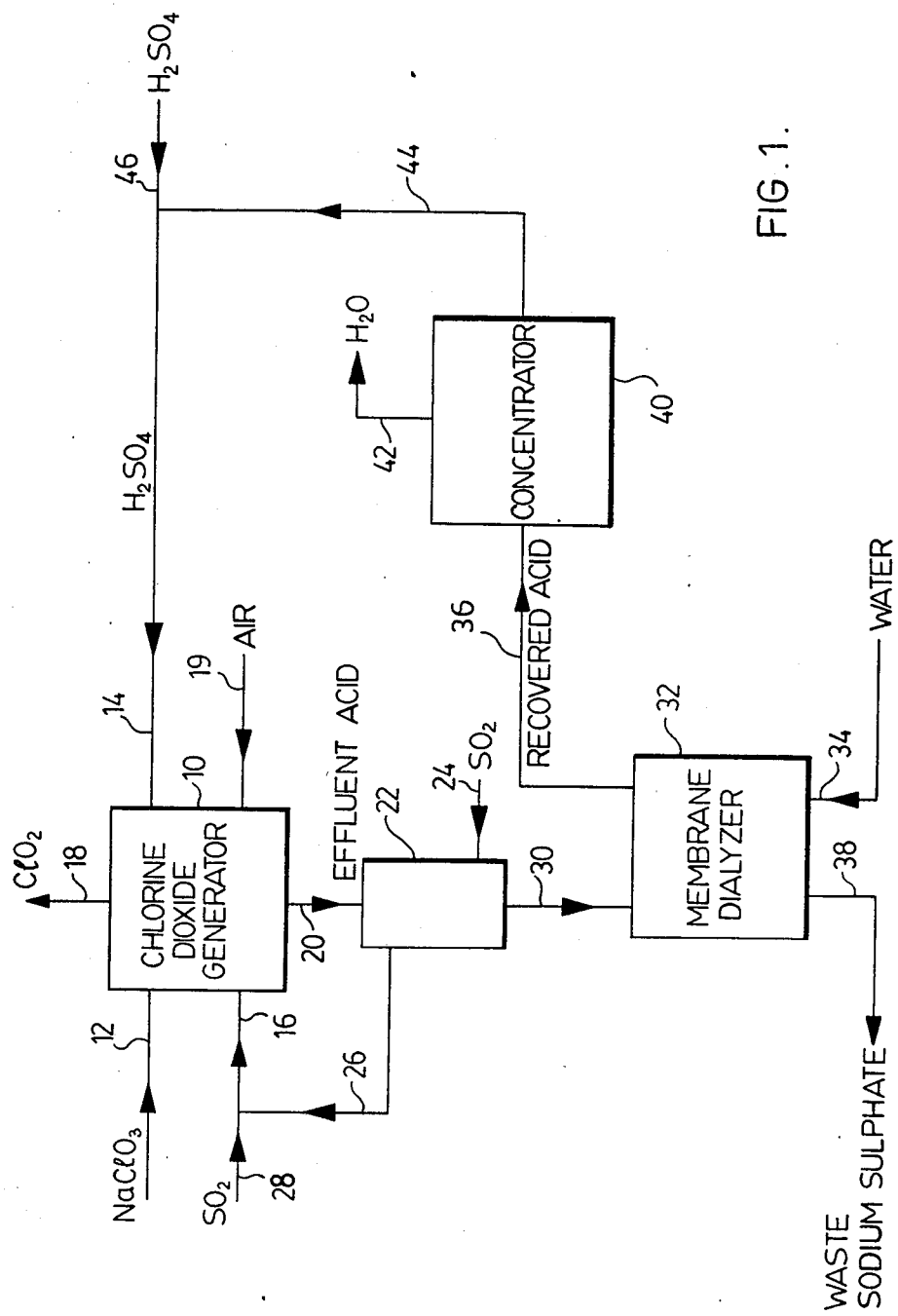
FIG. 1 is a schematic flow sheet of a chlorine dioxide generating process embodying the present invention.

Referring to FIG. 1, a chlorine dioxide generator 10 is fed with sodium chlorate solution by line 12, sulphuric acid by line 14 and sulphur dioxide by line 16. The reactants are fed continuously to the generator 10 and establish and maintain an aqueous acid reaction medium therein which produces chlorine dioxide by the Mathieson process. The gaseous chlorine dioxide is removed from the generator 10 by line 18, usually in gaseous admixture with air, blown into the generator 10 by line 19, and small amounts of chlorine.

An aqueous effluent containing sulphuric acid and by-product sodium sulphate is continuously removed from the generator 10 by line 20 and is processed in accordance with this invention to recover acid values therefrom. The effluent acid stream 20 contains some unreacted chlorate ions and often some dissolved chlorine dioxide and chlorine gases. To minimize any degradative effect that these oxidizing species may have on membranes used in the diffusiondialysis procedure, the effluent first is contacted, in a gas-liquid contact tower 22, with sulphur dioxide gas fed by line 24 to convert the chlorate ions and dissolved gases to harmless chloride ions and any dichromate ions to $Cr^{III}$ ions. Sulphur dioxide is the preferred reactant, since the effluent gas stream from the gas-liquid contact tower 22, in line 26, may provide all or part of the sulphur dioxide feed required in line 16 by the chlorine dioxide generator 10, with any additional sulphur dioxide requirement for the chlorine dioxide generator 10 being provided by line 28.

The treated effluent acid stream passes from the contact tower 22 by line 30 to a multiunit membrane dialyzer 32. The membrane dialyzer 32 generally is constituted by a plurality of individual membrane diffusiondialysis units comprising an anion-exchange membrane separating a chamber into two sections. The effluent acid stream in line 30 is fed in parallel to one of the sections of each diffusiondialysis unit and along one face of the membrane towards an outlet from that section. At the same time, water or another recipient aqueous medium is fed by line 34 in parallel to the other of the sections of each diffusiondialysis unit and along the opposite face of the membrane towards an outlet from that section in a flow direction which is countercurrent to the flow of the effluent acid stream.

In each of the individual units of the dialyzer 32, as the effluent acid stream 30 passes along one face of the membrane 28 while the water passes along the other face in countercurrent flow to the effluent acid stream, sulphuric acid migrates through the membrane in preference to the sodium sulphate and into the water stream to provide a recovered sulphuric acid stream which leaves each diffusiondialysis unit of the dialyzer 32 in parallel, so as to provide a single recovered sulphuric acid stream 36.

Sodium sulphate is preferentially retained by the membrane in the effluent acid stream. The resulting waste stream, depleted with respect to sulphuric acid and containing the bulk of the sodium sulphate present in the original effluent acid stream in line 20, is removed from each diffusiondialysis unit of the dialyzer 32 in parallel to form a combined waste acidic sodium sulphate stream in line 38. The waste acidic sodium sulphate stream may be used as a source of make-up sodium sulphate for the mill, if desired, for any other desired purpose, or may be discarded.

The recovered sulphuric acid stream in line 36 typically is too dilute for direct reuse in the chlorine dioxide generator 10. Hence, it is first forwarded to a concentrator 40 wherein the acid is concentrated by evaporation to remove water therefrom by line 42 until the desired acid concentration is reached. The more concentrated recovered sulphuric acid then is forwarded by lines 44 and 14 to the chlorine dioxide generator 10. Make-up sulphuric acid is added, as required by the chlorine dioxide generator 10, to the stream 44 by line 46.

In a typical operation of the process of FIG. 1, the effluent acid stream in line 20 leaving the generator 10 may contain about 4.5M $H_2SO_4$ and 2.5M $Na_2SO_4$, the recovered sulphuric acid stream in line 36 may contain about 3M $H_2SO_4$ with traces of $Na_2SO_4$, and the waste acidic sodium sulphate stream in line 38 may contain about 1.4M $H_2SO_4$ and 2.5M $Na_2SO_4$.

The process of the present invention, therefore, recovers reusable sulphuric acid from acidic effluent streams from non-evaporating chlorine dioxide generators and enables the disposal problems attendant the prior art procedures to be minimized without encountering the problems of the Lobley et al process.

EXAMPLES

Example 1

A series of experiments was conducted to effect diffusiondialysis of a solution of sulphuric acid and sodium sulphate simulating the effluent acid stream from a Mathieson-type chlorine dioxide generator. The experiments were conducted in a Model TSD-2 dialyzer manufactured by Tokuyama Soda Co., Japan. The dialyzer contained forty membranes each having an area of 200 sq. cm., thereby giving a total active exchange surface of 0.8 sq.m. The individual membranes are separated by the dialysis frames which contain flow distribution channels for the effluent and recovered acid streams respectively. Polypropylene net spacers prevent the membranes from collapsing against one another and act also as turbulence promoters. The forty dialysis compartments are positioned between two stainless steel end plates and bolted tightly together. Water and effluent acid were metered to the dialyzer in a countercurrent manner using two small diaphragm pumps. All streams flowing into and leaving the dialyzer were measured for volume and composition, enabling exact acid, salt and water balances to be determined. Sulphuric acid determinations were based on titration with a standardized sodium hydroxide solution while sodium sulphate content was calculated from sodium analysis.

The results obtained in the diffusiondialysis experiments are reproduced in the following Table I:

TABLE I

| RUN NO. | EFFLUENT ACID FEED | | | RECOVERED ACID | | |
|---|---|---|---|---|---|---|
| | TREATMENT RATE L/hr sq.m. | COMPOSITION (molarity) | | RECOVERY RATE L/hr sq.m.(1) | COMPOSITION (molarity) | |
| | | $H_2SO_4$ | $Na_2SO_4$ | | $H_2SO_4$ | $Na_2SO_4$ |
| 01 | 0362 | 4.300 | 2.176 | 0.193 | 4.370 | 0.659 |
| 02 | 0.355 | 4.300 | 2.176 | 0.372 | 3.460 | 0.413 |
| 03 | 0.363 | 4.300 | 2.176 | 0.662 | 2.251 | 0.190 |
| 04 | 0.361 | 4.300 | 2.176 | 0.264 | 3.870 | 0.490 |
| 05 | 0.570 | 4.300 | 2.176 | 0.419 | 3.880 | 0.330 |
| 06 | 0.574 | 4.300 | 2.176 | 0.645 | 2.930 | 0.240 |
| 07 | 0.655 | 4.418 | 2.450 | 0.628 | 3.312 | 0.250 |
| 08 | 0.664 | 4.418 | 2.450 | 0.757 | 2.983 | 0.196 |
| 09 | 0.773 | 4.418 | 2.450 | 0.757 | 3.240 | 0.218 |
| 10 | 0.773 | 4.420 | 2.450 | 0.829 | 3.000 | 0.196 |
| 11 | 0.770 | 4.420 | 2.450 | 0.647 | 3.510 | 0.283 |
| 12 | 0.773 | 4.420 | 2.450 | 0.468 | 4.060 | 0.315 |
| 13 | 0.860 | 4.420 | 2.450 | 0.860 | 3.112 | 0.185 |
| 14 | 0.856 | 4.420 | 2.450 | 0.765 | 3.321 | 0.228 |
| 15 | 0.573 | 4.420 | 2.450 | 0.760 | 2.843 | 0.212 |
| 16 | 0.658 | 4.440 | 2.430 | 0.770 | 2.970 | 0.226 |
| 17 | 0.657 | 4.400 | 2.430 | 0.791 | 3.175 | 0.250 |
| 18 | 0.849 | 4.601 | 2.720 | 0.814 | 3.303 | 0.261 |
| 19 | 0.575 | 4.601 | 2.720 | 0.630 | 3.334 | 0.304 |
| 20 | 0.834 | 4.601 | 2.720 | 0.835 | 03.238 | 0.268 |

| RUN NO. | WASTE ACIDIC SODIUM SULPHATE PRODUCT | | | ΔC ACID (molarity)(2) | ΔC SALT (molarity)(3) | FLUX (mole/hr sq.m.)(4) | | |
|---|---|---|---|---|---|---|---|---|
| | PROD RATE L/hr sq.m. | COMPOSITION (molarity) | | | | | | |
| | | $H_2SO_4$ | $Na_2SO_4$ | | | $H_2SO_4$ | $Na_2SO_4$ | WATER |
| 01 | 0.506 | 1.180 | 1.345 | — | 1.41 | 0.843 | 0.134 | 8.2 |
| 02 | 0.580 | 0.510 | 1.085 | 0.689 | 1.40 | 1.288 | 0.154 | 15.4 |
| 03 | 0.598 | 0.285 | 0.980 | 0.900 | 1.42 | 1.491 | 0.126 | 19.0 |
| 04 | 0.553 | 0.600 | 1.030 | 0.510 | 1.33 | 1.024 | 0.130 | 14.0 |
| 05 | 0.759 | 1.080 | 1.350 | 0.720 | 1.58 | 1.630 | 0.138 | 16.8 |
| 06 | 0.818 | 0.617 | 1.359 | 0.944 | 1.68 | 1.890 | 0.154 | 19.8 |
| 07 | 0.908 | 0.891 | 1.576 | 0.994 | 1.93 | 2.080 | 0.156 | 21.6 |
| 08 | 0.918 | 0.776 | 1.576 | 1.072 | 1.94 | 2.259 | 0.48 | 22.6 |
| 09 | 0.902 | 0.967 | 1.630 | 1.064 | 1.96 | 2.453 | 0.164 | 23.5 |
| 10 | 1.026 | 0.949 | 1.685 | 1.169 | 1.96 | 2.486 | 0.162 | 22.1 |
| 11 | 1.026 | 1.107 | 1.685 | 1.005 | 1.92 | 2.271 | 0.183 | 23.0 |
| 12 | 0.968 | 1.556 | 1.815 | 0.817 | 1.97 | 1.902 | 0.169 | 18.7 |
| 13 | 1.103 | 1.131 | 1.793 | 1.217 | 2.02 | 2.676 | 0.159 | 22.5 |
| 14 | 1.119 | 1.094 | 1.630 | 1.100 | 1.91 | 2.541 | 0.174 | 23.7 |
| 15 | 0.828 | 0.660 | 1.413 | 1.053 | 1.79 | 2.161 | 0.161 | 21.8 |

TABLE I-continued

| | | | | | | | | |
|---|---|---|---|---|---|---|---|---|
| 16 | 0.876 | 0.780 | 1.674 | 1.067 | 1.93 | 2.279 | 0.174 | 19.8 |
| 17 | 0.869 | 0.826 | 1.717 | 1.012 | 1.94 | 2.194 | 0.173 | 19.7 |
| 18 | 1.236 | 1.154 | 1.935 | 1.224 | 2.19 | 2.689 | 0.212 | 23.1 |
| 19 | 0.820 | 0.751 | 1.663 | 0.987 | 2.02 | 2.100 | 0.191 | 21.7 |
| 20 | 1.093 | 1.062 | 1.826 | 1.206 | 2.12 | 2.705 | 0.224 | 24.0 |

| RUN NO | U[mole/hr sq. m. (molarity)][5] | | U ACID / U SALT | ESR[6] | ACID RECOVERY RATIO (%) |
|---|---|---|---|---|---|
| | $H_2SO_4$ | $Na_2SO_4$ | | | |
| 01 | — | 0.095 | — | 3.2 | 53.9 |
| 02 | 1.87 | 0.110 | 17.0 | 4.2 | 83.9 |
| 03 | 1.66 | 0.088 | 18.8 | 6.0 | 95.0 |
| 04 | 2.00 | 0.097 | 20.5 | 4.0 | 66.0 |
| 05 | 2.26 | 0.087 | 26.0 | 6.0 | 66.3 |
| 06 | 2.00 | 0.092 | 21.9 | 6.2 | 76.7 |
| 07 | 2.09 | 0.082 | 25.5 | 7.3 | 71.8 |
| 08 | 2.11 | 0.076 | 27.7 | 8.1 | 77.0 |
| 09 | 2.30 | 0.084 | 27.4 | 8.2 | 71.8 |
| 10 | 2.13 | 0.083 | 25.6 | 8.5 | 72.8 |
| 11 | 2.26 | 0.096 | 23.6 | 6.9 | 66.7 |
| 12 | 2.33 | 0.086 | 27.2 | 7.1 | 55.7 |
| 13 | 2.20 | 0.072 | 30.6 | 9.4 | 70.4 |
| 14 | 2.31 | 0.091 | 25.4 | 8.1 | 67.1 |
| 15 | 2.05 | 0.090 | 22.8 | 7.4 | 85.3 |
| 16 | 2.14 | 0.090 | 23.7 | 7.2 | 78.7 |
| 17 | 2.17 | 0.090 | 24.3 | 7.0 | 75.9 |
| 18 | 2.200 | 0.097 | 22.7 | 7.5 | 68.9 |
| 19 | 2.13 | 0.095 | 22.4 | 6.5 | 79.4 |
| 20 | 2.24 | 0.105 | 21.3 | 7.1 | 70.5 |

Notes on Table I:

[1] Recovery rate is the production rate of recovered sulphuric acid.

[2]
$$\Delta C_{ACID} = \frac{[C_{\text{effluent acid}} - C_{\text{recovered acid}}] - C_{\text{waste product}}}{\ln \left[ \frac{C_{\text{effluent acid}} - C_{\text{recovered acid}}}{C_{\text{waste product}}} \right]}$$ wherein C is the concentration of the acid in the stream

[3]
$$\Delta C_{SALT} = \frac{[C_{\text{effluent acid}} - C_{\text{recovered acid}}] - C_{\text{waste product}}}{\ln \left[ \frac{C_{\text{effluent acid}} - C_{\text{recovered acid}}}{C_{\text{waste product}}} \right]}$$ wherein C is the concentration of sodium sulphate in the stream

[4] Flux = Recovered sulphuric acid production rate × composition of recovered sulphuric acid

[5] U is the dialysis coefficient and $= \frac{\text{Flux}}{\Delta C}$

[6] ESR is the effective selectively ratio and $= \dfrac{\text{Flux}_{H_2SO_4}/\text{Flux}_{Na_2SO_4}}{C_{H_2SO_4 \text{ in effluent acid}}/C_{Na_2SO_4 \text{ in effluent acid}}}$ As may be seen from the results presented in the above Table I, the salt flux remained approximately constant irrespectiv of dialysis conditions and was dependent only on the original sodium sulphate content in the effluent acid. By increasing the flow rates of the effluent and recovered acid streams, a fairly large average acid gradient ($\Delta C_{acid} = 1.2$ to 1.3M) was maintained across the membrane. The $\Delta C_{acid}$ could not be increased further without compromising targeted values of Acid Recovery Ratio of 70% and/or strength of recovered acid (3.0M).

Figure 2:
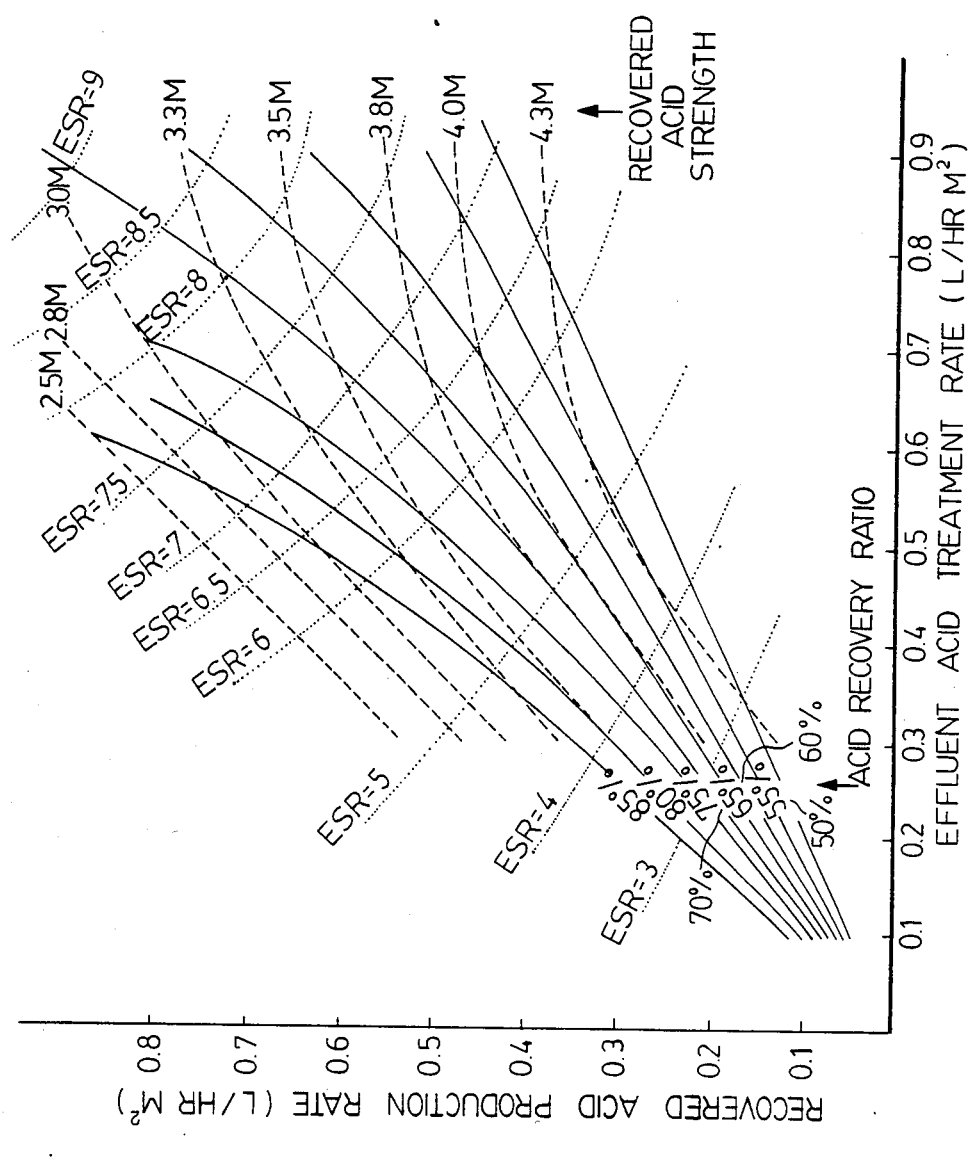
FIG. 2 is a performance diagram constructed from data presented in the Examples below.

Based on the data presented in Table I above, a performance diagram for the dialysis process at room temperature was prepared and this diagram is reproduced as FIG. 2 of the drawings. From this Figure, the Acid Recovery Ratio, Recovery Acid Strength and Effective Selectivity Ratio (ESR) may be reasonably accurately estimated for any given dialysis conditions of Effluent Acid Treatment rate and Recovered Acid Production rate.

Example 2

Based on the experimental data set forth in Example 1 and other known technical information, a mass balance was calculated for a 3 tone per day Mathieson chlorine dioxide generator operating in accordance with the flow sheet of FIG. 1 of the drawings.

The following Table II sets forth the flow rates and compositions for the various streams for the initial cycle:

TABLE II

| Stream | Composition | Flow rate USG/min |
|---|---|---|
| Line 20 | 4.5 M $H_2SO_4$, 2.5 M $Na_2SO_4$, 0.1 M $ClO_3^-$ | 1.72 |
| Line 30 | 4.8 M $H_2SO_4$, 2.5 M $Na_2SO_4$ | 1.72 |
| Line 34 | $H_2O$ | 2.27 |
| Line 36 | 3.4 M $H_2SO_4$, 0.2 M $Na_2SO_4$ (70% of $H_2SO_4$ in line 30. ESR of membrane = 8.85) | 1.72 |
| Line 38 | 1.06 M $H_2SO_4$, 1.75 M $Na_2SO_4$ | 2.26 |
| Line 44 | 10.3 M $H_2SO_4$ (63%), 0.604 M $Na_2SO_4$ | 0.57 |
| Line 42 | $H_2O$ (steam) | 1.15 |
| Line 46 | 93% $H_2SO_4$ | 0.14 |
| Line 14 | 11.7 M $H_2SO_4$, 0.485 M $Na_2SO_4$ | 0.71 |

To obtain the overall mass balance for steady state conditions, the same loop is repeated with the inclusion of the volume resulting from the initial cycle. The following Table III sets forth the overall mass balance flow rates and composition for the various streams:

TABLE III

| Stream | Composition | Flow rate USG/min |
|---|---|---|
| Line 20 | 4.0 M $H_2SO_4$, 2.4 M $Na_2SO_4$, 0.1 M $ClO_3^-$ | 1.95 |
| Line 30 | 4.3 M $H_2SO_4$, 2.4 M $Na_2SO_4$ | 1.95 |
| Line 34 | $H_2O$ | 2.27 |
| Line 36 | 3.01 M $H_2SO_4$, 0.19 M $Na_2SO_4$ | 1.95 |

TABLE III-continued

| Stream | Composition | Flow rate USG/min |
|---|---|---|
| Line 38 | 0.98 M H$_2$SO$_4$, 1.68 M Na$_2$SO$_4$ | 2.56 |
| Line 44 | 10.3 M H$_2$SO$_4$, 0.65 M Na$_2$SO$_4$ | 0.57 |
| Line 42 | H$_2$O (steam) | 1.38 |
| Line 46 | 93% H$_2$SO$_4$ | 0.14 |
| Line 14 | 11.7 M H$_2$SO$_4$, 0.52 M Na$_2$SO$_4$ | 0.71 |

In the absence of the acid recovery system of the invention, a Mathieson-type chlorine dioxide generator operating under the same conditions and producing an effluent acid stream of the same concentration requires 0.48 USG/min of 93% H$_2$SO$_4$. As may be seen from the above Table III, the requirement for 93% H$_2$SO$_4$ is substantially decreased to 0.14 USG/min.

SUMMARY OF DISCLOSURE

In summary of this disclosure, the present invention provides a novel procedure for treating an acid effluent stream from chlorine dioxide generation to recover sulphuric acid therefrom in a form suitable for concentration and recycle to the process. Modifications are possible within the scope of this invention.

What I claim is:

1. A process for the production of chlorine dioxide, which comprises:
   reducing sodium chlorate in an aqueous sulphuric acid-containing reaction medium to which chlorine dioxide-generating reactants are continuously fed,
   continuously removing a sulphuric acid- and sodium sulphate-containing aqueous effluent stream from said reaction zone,
   continuously effecting preferential sulphuric acid migration from said effluent stream across an anion-exchange membrane to a recipient aqueous medium which has a lesser acid concentration than the effluent stream to the extent of at least about 70% of the sulphuric acid in said effluent stream to form a sulphuric acid stream having a concentration of at least about 3.0 molar H$_2$SO$_4$ and simultaneous preferential sodium sulphate retention in the effluent stream, whereby there is recovered from said effluent stream a sulphuric acid stream which can be concentrated to about 65% H$_2$SO$_4$ without precipitation of sodium sulphate therefrom,
   concentrating said sulphuric acid stream to a concentration of at least about 65% H$_2$SO$_4$ without precipitating sodium sulphate therefrom to provide a concentrated sulphuric acid stream suitable for feed as one of said chlorine dioxide-generating reactants to said aqueous reaction medium, and
   recycling said concentrated sulphuric acid stream to said aqueous reaction medium.

2. The process of claim 1 which is effected by flowing said aqueous effluent stream onto one side of said anion-exchange membrane while flowing said recipient aqueous medium onto the other side of the membrane.

3. The process of claim 2 wherein said aqueous effluent stream and said recipient aqueous medium flow along the faces of the membrane on the respective sides thereof.

4. The process of claim 3 wherein said aqueous effluent stream and said recipient aqueous medium flow countercurrently to one another on their respective sides of the membrane.

5. The process of claim 1 wherein said chlorine dioxide generating process is the Mathieson process and said effluent acid stream has a sulphuric acid concentration of about 4.3 to about 4.6 molar H$_2$SO$_4$ and a sodium sulphate concentration of about 2.1 to about 2.8 molar Na$_2$SO$_4$.

6. The process of claim 1 wherein said chlorine dioxide generating process is the R2-process and said effluent acid stream has a sulphuric acid concentration of about 4.5 to about 5.5 molar H$_2$SO$_4$ and a sodium sulphate concentration of about 2.3 to about 3.0 molar Na$_2$SO$_4$.

7. The process of claim 1 wherein said chlorine dioxide generating process is the Solvay process and said effluent acid stream has a sulphuric acid concentration of about 3.5 to about 4.6 molar H$_2$SO$_4$ and a sodium sulphate concentration of about 1.8 to about 2.8 molar Na$_2$SO$_4$.

8. The process of claim 1 including reducing active chlorine species present in said aqueous effluent stream substantially to chloride ions prior to said membrane treatment.

9. The process of claim 8 wherein said active chlorine species reduction is effected using sulphur dioxide.

10. The process of claim 9 wherein said chlorine dioxide generating process is the Mathieson process and unreacted sulphur dioxide gas from said active chlorine species reduction is used in said Mathieson process.

11. The process of claim 1 including reducing dichromate ions present in said aqueous effluent stream substantially to $C_r^{III}$ ions prior to said membrane treatment.

12. The process of claim 1 wherein said recipient aqueous medium is water.

13. The process of claim 1 which is effected using a multiple number of anion-exchange membranes.

14. The process of claim 13 wherein said aqueous effluent stream is divided into a plurality of effluent acid streams corresponding in number to the number of said anion-exchange membranes, the effluent acid streams are flowed in parallel along one face of the membranes, said recipient aqueous medium is water and is divided into a plurality of water streams corresponding in number to the number of said anion-exchange membranes, said water streams are flowed in parallel along the other face of the membranes countercurrent to the direction of flow of the effluent acid streams, the resulting plurality of recovered sulphuric acid streams are joined to form a single recovered sulphuric acid stream, and the resulting plurality of acidic sodium sulphate waste streams are joined to form a single acidic sodium sulphate waste stream.

15. A process for the production of chlorine dioxide, which comprises:
   continuously feeding sodium chlorate, sulphur dioxide and sulphuric acid to an aqueous acid reaction medium contained in a reaction zone,
   continuously generating chlorine dioxide from said reaction medium and removing said generated chlorine dioxide from the reaction zone,
   continuously removing a sulphuric acid- and sodium sulphate-containing aqueous effluent from said reaction zone, said effluent stream further containing active chlorine species,
   continuously contacting said effluent stream with an excess of sulphur dioxide gas to reduce said active chlorine species to chloride ions to form a sulphur dioxide-treated effluent stream, continuously forwarding unreacted sulphur dioxide from said active chlorine species reduction to said reaction zone to provide at least part of the feed of sulphur dioxide thereto, continuously effecting preferential sulphuric acid migration from said sulphur dioxide-treated effluent stream across an anion-exchange membrane to a water stream, thereby to form a sulphuric acid stream, and simultaneous preferential sodium sulphate retention in said sulphur dioxide-treated effluent stream, and recovering said sulphuric acid stream.

16. The process of claim 15 wherein said effluent acid stream has a sulphuric acid concentration of about 4.3 to about 4.6 molar $H_2SO_4$ and a sodium sulphate concentration of about 2.1 to about 2.8 molar $H_2SO_4$.

17. The process of claim 16 wherein at least about 70% of the sulphuric acid present in said effluent stream is migrated across the ion-exchange membrane to form said sulphuric acid stream having a concentration of at least about 3.0 molar $H_2SO_4$ and which may be concentrated to about 65% $H_2SO_4$ without precipitation of sodium sulphate therefrom.

18. The process of claim 17, including concentrating the sulphuric acid stream to a concentration of at least about 65% $H_2SO_4$ without the precipitation of sodium sulphate therefrom and recycling the resulting concentrated sulphuric acid to said reaction zone to provide part of said sulphuric acid fed thereto.

19. A new process for the production of chlorine dioxide, which comprises:

reducing sodium chlorate in an aqueous sulphuric acid-containing reaction medium to which chlorine dioxide-generating reactants are continuously fed and which is contained in a reaction zone, said chlorine dioxide-generating reactants including sodium chlorate in the form of an aqueous solution thereof containing sodium dichromate, continuously removing chlorine dioxide generated from said reaction medium from the reaction zone, continuously removing from said reaction zone a sulphuric acid- and sodium sulphate-containing aqueous effluent which also contains sodium dichromate fed to said reaction zone with the sodium chlorate solution, continuously reducing the dichromate ions present in said aqueous effluent stream substantially to $Cr^{III}$ ions to form a treated effluent stream, continuously effecting preferential sulphuric acid migration from said treated effluent stream across an anion-exchange membrane to a water stream, thereby to form a sulphuric acid stream, and simultaneous preferential sodium sulphate and $Cr^{III}$ ions retention in said treated effluent stream, and recovering said sulphuric acid stream.

20. The process of claim 19 wherein said aqueous effluent stream also contains active chlorine species and said reduction of said dichromate ions also effects reduction of said active chlorine species to chloride ions.

21. The process of claim 20 wherein said reduction of said dichromate ions and said active chlorine species is effected using sulfur dioxide.

22. The process of claim 20 wherein at least about 70% of the sulphuric acid present in said effluent stream is migrated across the ion-exchange membrane to form said sulphuric acid stream having a concentration of at leat about 3.0 molar $H_2SO_4$ and which may be concentrated to about 65% $H_2SO_4$ without precipitation of sodium sulphate therefrom.

23. The process of claim 22, including concentrating the sulphuric acid stream to a concentration of at least about 65% $H_2SO_4$ and recycling the resulting concentrated sulphuric acid to said reaction zone to provide part of said chlorine dioxide-generating reactants.

24. The process of claim 1 wherein said effluent stream is filtered to remove particulate solids therefrom prior to effecting said preferential acid migration thereon.

* * * * *

UNITED STATES PATENT AND TRADEMARK OFFICE
CERTIFICATE OF CORRECTION

PATENT NO. : 4,678,655
DATED : July 7, 1987
INVENTOR(S) : Zbigniew Twardowski

It is certified that error appears in the above-identified patent and that said Letters Patent is hereby corrected as shown below:

On the title page assignee should read

--(73) Assignee: Tenneco Canada Inc. --.

Signed and Sealed this

Fifth Day of January, 1988

Attest:

DONALD J. QUIGG

*Attesting Officer*　　　　　*Commissioner of Patents and Trademarks*